(12) United States Patent
Tu

(10) Patent No.: US 11,020,764 B2
(45) Date of Patent: Jun. 1, 2021

(54) REWINDING WATERWHEEL, TRANSMISSION GEARBOX OF THE WATERWHEEL, AND IRRIGATION METHOD THEREOF

(71) Applicant: Wei Tu, Yuyao (CN)

(72) Inventor: Wei Tu, Yuyao (CN)

(*) Notice: Subject to any disclaimer, the term of this patent is extended or adjusted under 35 U.S.C. 154(b) by 178 days.

(21) Appl. No.: 15/989,649

(22) Filed: May 25, 2018

(65) Prior Publication Data
US 2019/0299238 A1    Oct. 3, 2019

(30) Foreign Application Priority Data

Mar. 27, 2018  (CN) .......................... 201810257587.2
Mar. 27, 2018  (CN) .......................... 201820418176.2

(51) Int. Cl.
*B05B 13/00*   (2006.01)
*B05B 3/04*    (2006.01)
*F16H 37/02*   (2006.01)

(52) U.S. Cl.
CPC .......... *B05B 13/005* (2013.01); *B05B 3/0481* (2013.01); *F16H 37/021* (2013.01)

(58) Field of Classification Search
CPC .... A01G 25/09; A01G 25/095; A01G 25/097; A01G 25/16; B05B 13/005; B05B 3/0481; Y10T 137/6932; Y10T 137/6929; Y10T 137/6954; Y10T 137/6899; Y10T 137/6918; B65H 75/4407; B65H 75/4489; B65H 75/403; B65H 75/4484; B65H 2701/33
See application file for complete search history.

(56) References Cited

U.S. PATENT DOCUMENTS

| 3,583,636 | A | * | 6/1971 | Lacey | A01G 25/095 239/745 |
| 4,445,643 | A | * | 5/1984 | Thorsby | A01G 25/095 137/355.2 |
| 5,020,730 | A | * | 6/1991 | Perroud | A01G 25/095 239/63 |
| 5,711,490 | A | * | 1/1998 | Hansinger | A01G 25/095 239/197 |
| 6,595,464 | B2 | * | 7/2003 | Peck | B65H 57/14 242/615.2 |

(Continued)

*Primary Examiner* — Qingzhang Zhou
*Assistant Examiner* — Christopher R Dandridge
(74) *Attorney, Agent, or Firm* — Charles C. Achkar; Ostrolenk Faber LLP.

(57) ABSTRACT

A rewinding waterwheel includes a secondary body, a main body and guide members. The main body includes a rewinding waterwheel frame, a hub ring shaft and a water pipe wound around the hub ring shaft. The hub ring shaft is installed onto the rewinding waterwheel frame and rotatable. The secondary body includes a waterwheel frame and a sprinkler head mounted onto the waterwheel frame. The water pipe is fixed and communicated to the sprinkler head; the guide member is installed on the ground; the water pipe is in a rolling contact with the outer circumferential surface of the guide member. In a water spray method of the rewinding waterwheel, a traveling path is designed to achieve automatic lawn irrigation by the guide member in contact with the water pipe and to change the irrigation speed by the transmission gearbox to control water volume and save energy.

18 Claims, 14 Drawing Sheets

(56) References Cited

U.S. PATENT DOCUMENTS 6,745,959 B2 *  6/2004  Reid .......................... B05B 3/06
                                                      239/255
8,807,465 B2 *  8/2014  Korus .................... B65H 75/36
                                                      239/734

* cited by examiner

REWINDING WATERWHEEL, TRANSMISSION GEARBOX OF THE WATERWHEEL, AND IRRIGATION METHOD THEREOF

CROSS REFERENCE TO RELATED APPLICATIONS

The present application claims priority to Chinese Application Nos. 201810257587.2, filed on Mar. 27, 2018 and 201820418176.2, filed Mar. 27, 2018, the subject matter of each of which are incorporated by reference in their entirety.

FIELD OF INVENTION

The present disclosure relates to the field of lawn maintenance equipment, in particular to a rewinding waterwheel, a transmission gearbox of the waterwheel, and their irrigation method.

BACKGROUND OF INVENTION

1. Description of the Related Art

A waterwheel is generally applied to lawn irrigation and extensively used in places with a lawn. However, the conventional waterwheel has the following shortcomings that required improvements. 1. In general, the waterwheel is driven manually for the irrigation, and thus the operation is inconvenient and such irrigation incurs a higher labor cost. 2. The irrigation cannot be performed automatically in some special terrain shape (such as the L-shaped, S-shaped, or any irregular shaped terrain). 3. The moving speed and irrigation range of the conventional waterwheel are fixed and cannot be adjusted.

2. Summary of the Invention

Problem to be Solved

This disclosure provides a rewinding waterwheel, a transmission gearbox of the waterwheel, and an irrigation method of the waterwheel to overcome the aforementioned shortcomings of the conventional waterwheel that requires an inconvenient manual operation, cannot adjust the moving speed and irrigation range, and fails to irrigate places with special terrains.

Technical Solution

To overcome the aforementioned shortcomings of the prior art, this disclosure provides a rewinding waterwheel comprising a secondary body, a main body and a plurality of guide members; characterized in that:

the main body comprises a rewinding waterwheel frame, a hub ring shaft, and a water pipe wound around the hub ring shaft, and the hub ring shaft is installed onto the rewinding waterwheel frame and capable of rotate;

the secondary body comprises a waterwheel frame and a sprinkler head fixed and mounted onto the waterwheel frame, and the water pipe has an end fixed and communicated to the sprinkler head; and the guide member is installed on the ground, and the water pipe is in a rolling contact with the outer circumferential surface of the guide member.

In the rewinding waterwheel, the guide member comprises a fixed bracket and a guide wheel installed onto the fixed bracket and capable of rotating with respect to the fixed bracket.

The rewinding waterwheel further comprises a bearing installed between the guide wheel and the fixed bracket.

In the rewinding waterwheel, the fixed bracket has a lower end which is a pin structure.

In the rewinding waterwheel, the outer circumferential surface of the guide wheel is a ring-shaped and concavely formed arc groove, and the water pipe is installed in the arc groove.

In the rewinding waterwheel, the secondary body further comprises a gate valve switch for controlling the ON/OFF status of the sprinkler head, and the gate valve switch is rotated forward to turn off the sprinkler head and rotated backward to turn on the sprinkler head; after the rewinding of the water pipe, the gate valve switch is contacted with the rewinding waterwheel frame, and a tightening force of the water pipe is provided to drive the gate valve switch to be rotated forward to turn off the sprinkler head.

In the rewinding waterwheel, the gate valve switch comprises a valve, a hand rod, a link rod, a hinge plate and a piston head, and the water pipe, the valve, and the sprinkler head are sequentially communicated to one another from bottom to top, and the valve comprises a piston hole and a hinge seat, and an end of the piston head is transversally and movably plugged into the piston hole, and the other end of the piston head is coupled to the hinge plate, and both upper and lower ends of the hinge plate are rotatably coupled to the hinge seat and the link rod respectively, and the waterwheel frame has a mounting plate installed thereto, and the hand rod is rotatably installed onto the mounting plate, and the link rod is hinged to an end of the hand rod.

The rewinding waterwheel further comprises a spring with both ends coupled to the hand rod and the mounting plate respectively, and the hand rod is always pulled back by the resilience of the spring.

In the rewinding waterwheel, the waterwheel frame has two symmetrical guide rods installed to the rear of the water frame, and a wheel installed at the bottom of the waterwheel frame and disposed on an inner side of the guide rod In the rewinding waterwheel, the guide rod is tilted with an angle.

The rewinding waterwheel further comprises a water turbine; the hub ring shaft has a coaxial inner toothed ring disposed on an axial side, and the water turbine comprises a turbine shaft, and an impeller and a shaft gear disposed at both ends of the turbine shaft respectively; the shaft gear is engaged and transmitted directly or indirectly with the inner toothed ring, and the impeller drives the shaft gear to rotate after external water pressure enters into the interior of the water turbine.

The rewinding waterwheel further comprises a first connecting pipe communicated to the water inlet of the water turbine, and external water enters from the first connecting pipe into the water turbine, and the first connecting pipe has a pressure gauge for detecting the external water pressure and a pressure valve for regulating the external water pressure.

The rewinding waterwheel further comprises a second connecting pipe, and the hub ring shaft includes a coaxial water hole, and the other end of the water pipe is communicated with the water hole, and the second connecting pipe has an end communicated to a water outlet of the water turbine and the other end communicated to the water hole The rewinding waterwheel further comprises a transmission gearbox, and the shaft gear is engaged and transmitted with the inner toothed ring after the speed is changed by the transmission gearbox.

A water spray method of a rewinding waterwheel comprising the following steps:

(a) Pre-set a traveling path of a waterwheel according to the irrigation range of the waterwheel and the shape and area of a lawn.

Set a main body with a rewinding water pipe function at a start point of the traveling path according to the traveling path, and then the main body starts to roll the water pipe, so that a secondary body with a water spray function moves along the traveling path to an end point of the traveling path.

(c) Plug a guide member to a corner point in the traveling path, so that the water pipe is in a rolling contact with the guide member.

(d) Rewind the water pipe by the main body, so that the secondary body performs irrigation along the traveling path through the guide member.

A transmission gearbox of a rewinding waterwheel comprises: a box, a first transmission gear set installed in the box, a second transmission gear set, a transmission belt and a speed regulating mechanism installed between the first transmission gear set and the second transmission gear set.

Both of the first transmission gear set and the second transmission gear set have a transmission shaft rotatably installed into the box and a transmission gear axially fixed to the transmission shaft, and each transmission shaft has two symmetrical spacing adjustment mechanisms, and each spacing adjustment mechanism includes a pulley, a clutch gear and an external threaded sleeve arranged sequentially from the inside to the outside.

The clutch gear is sheathed on the external threaded sleeve and coupled to the external threaded sleeve by a thread, and the pulley moves in an axial direction with respect to the transmission shaft, and the outer circumferential surface of the pulley has a bevel, and an interval is formed between the bevels of two pulleys for installing the transmission belt.

The speed regulating mechanism comprises a speed regulating shaft rotatably installed into the box, and the speed regulating hand wheel and two speed gears coaxially fixed to the speed regulating shaft, and the speed regulating hand wheel and the speed regulating shaft are coupled to each other for controlling the rotation of the speed regulating shaft, and the speed gears are engaged and transmitted with both left and right clutch gears respectively.

The clutch gear of the two spacing adjustment mechanisms in the first transmission gear set and the thread structure of the external threaded sleeve are left handed and right handed respectively, and the clutch gear of the two spacing adjustment mechanisms in the second transmission gear set and the thread structure of the external threaded sleeve are right-handed and left-handed respectively.

In the transmission gearbox of the rewinding waterwheel, the transmission gear of the first transmission gear set is transmitted and cooperated with the rewinding waterwheel, and the transmission gear of the second transmission gear set is transmitted and cooperated with the output gear.

In the transmission gearbox of the rewinding waterwheel, the pulley includes a polygonal shaft hole, and a section of the transmission shaft has a cross-section in a polygonal shape, and the shaft hole is sheathed on the section of the transmission shaft The transmission gearbox of the rewinding waterwheel further comprises a plurality of steel balls, and the clutch gear comprises a coaxial ring, and both inner circumferential surfaces of the ring and the pulley have an arc ring groove, and the steel balls are installed into the two ring grooves.

The transmission gearbox of the rewinding waterwheel further comprises a clutch mechanism, and the clutch mechanism comprises a clutch handle and a clutch shaft; and the clutch shaft is installed onto the box and axially movable, and the clutch shaft has an end coupled to the handle, and the other end installed with an axial output gear and a clutch gear, and the output gear is engaged and transmitted with the inner toothed ring of the rewinding waterwheel, and the clutch gear is cooperated and transmitted with the transmission gear of the second transmission gear set Beneficial Effects The rewinding waterwheel and its irrigation method of this disclosure not just achieves an automated irrigation with the features of convenient operation and labor saving only, but also improves the practicality of the rewinding waterwheel to achieve the automated irrigation for different terrains with different shapes. In addition, the transmission structure of the transmission gearbox can regulate the irrigation speed of the waterwheel and the rewinding speed of the water pipe, and control the total water volume of the irrigation to achieve the effects of preventing any unnecessary waste of water resources and saving energy.

DESCRIPTION OF THE EMBODIMENTS

Figure 1:
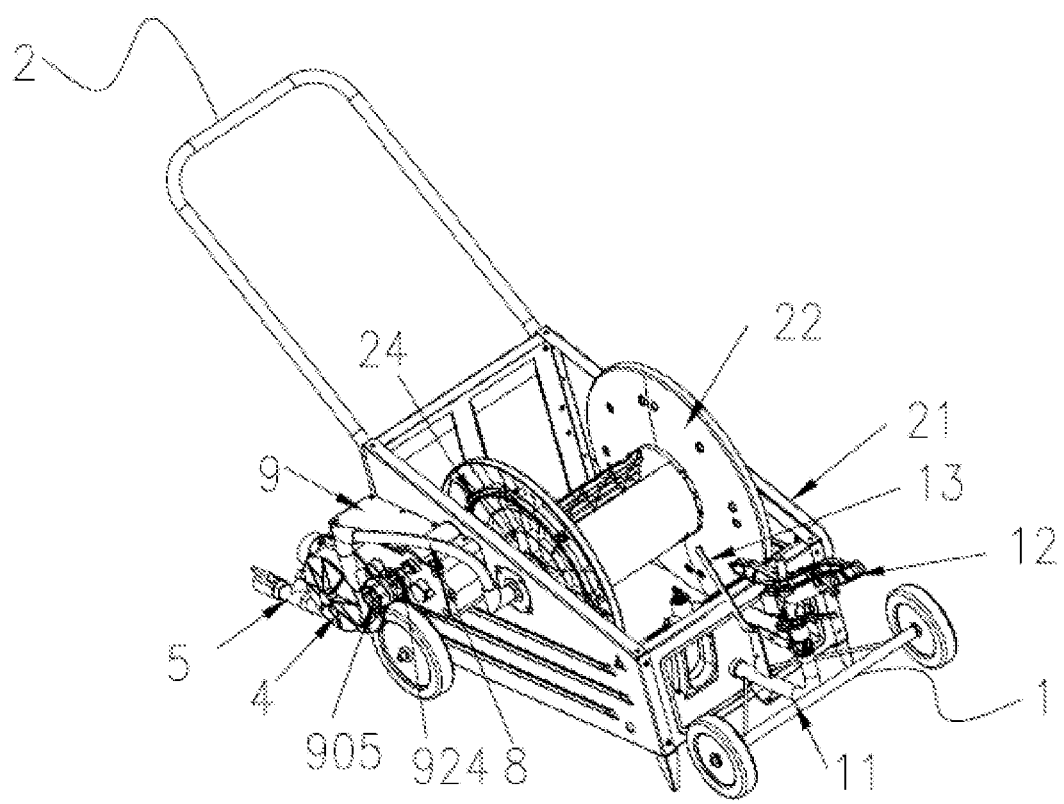
FIG. 1 is a perspective view of a manual rewinding waterwheel of this disclosure.

To understand the technical characteristics of this disclosure intuitively and comprehensively, exemplary embodiments are used and illustrated in referenced figures of the drawings. It is intended that the embodiments and figures disclosed herein are to be considered illustrative rather than restrictive.

With reference to FIGS. 1 to 12 for a rewinding waterwheel of this disclosure, the rewinding waterwheel comprises a secondary body 1, a main body 2 and a plurality of guide members 3; characterized in that the main body comprises a rewinding waterwheel frame 21, a hub ring shaft 22 and a water pipe 23 wound around the hub ring shaft, and the hub ring shaft 22 is installed onto the rewinding waterwheel frame 21 and rotatable. The secondary body 1 comprises a waterwheel frame 11 and a sprinkler head 12 fixed and mounted onto the waterwheel frame, and an end of the water pipe 23 is fixed and communicated to the sprinkler head 12.

Figure 2:
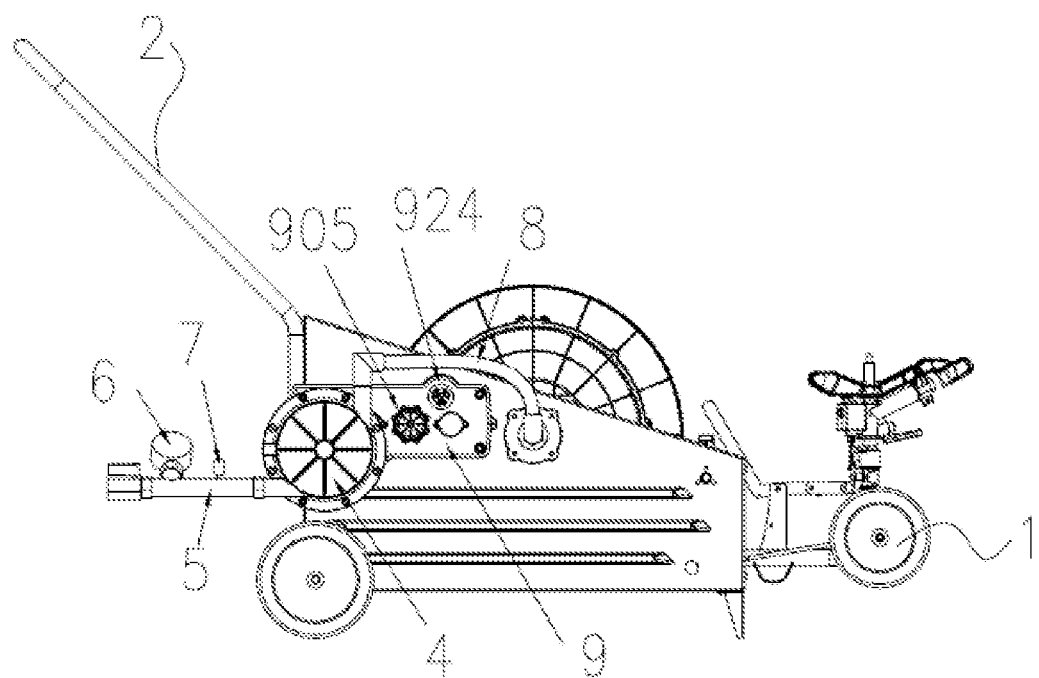
FIG. 2 is a left side view of a manual rewinding waterwheel of this disclosure.
Figure 3:
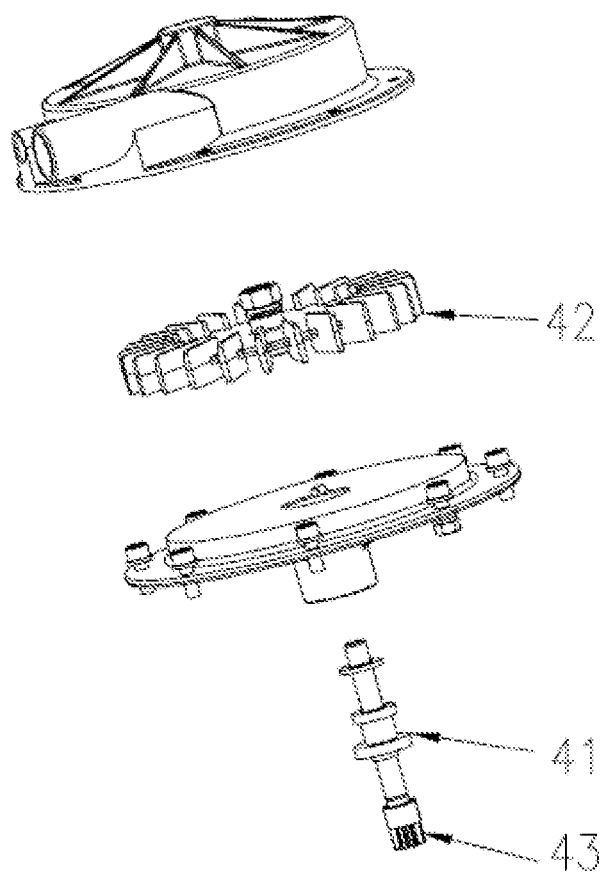
FIG. 3 is an exploded view of a water turbine of this disclosure.
Figure 4:
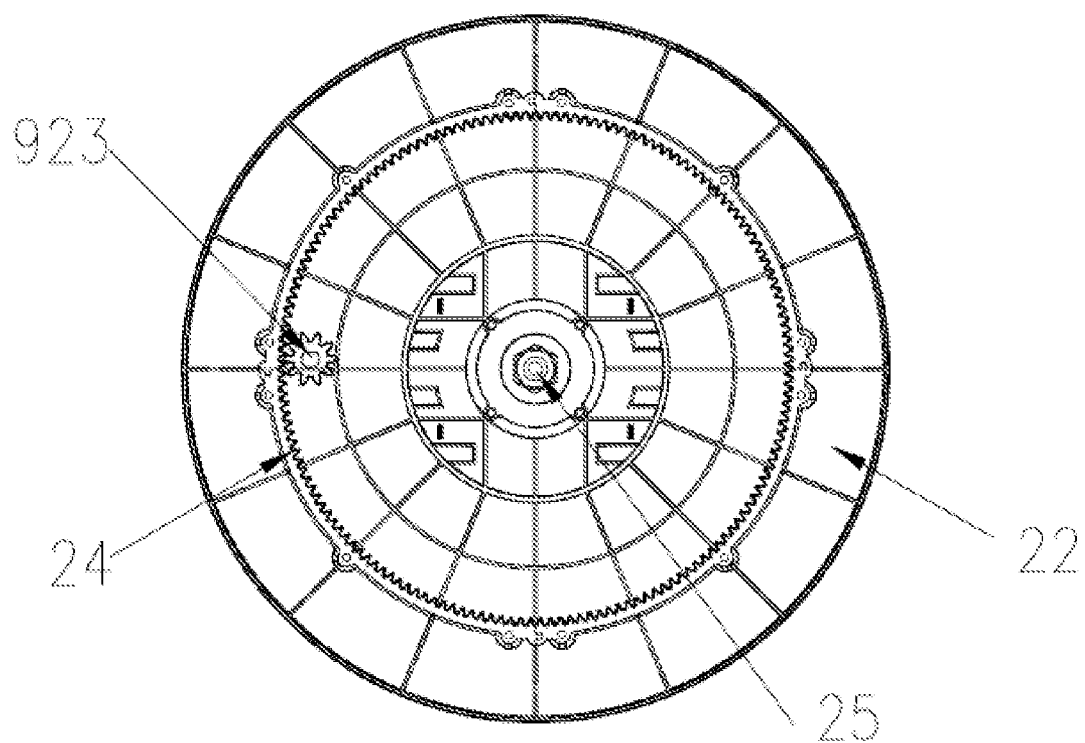
FIG. 4 is a schematic view of connecting a wheel and a power output gear with a in accordance with this disclosure.

In FIGS. 1 and 2, when the rewinding waterwheel is designed as a manual structure, the secondary body 1 and the main body 2 can be coupled to each other by a snapping structure to form an integral structure, so that the waterwheel can be driven manually for the irrigation.

In FIGS. 1 to 4, this disclosure further comprises a water turbine 4 and a transmission gearbox 9, and a coaxial inner toothed ring 24 is disposed on an axial side of the hub ring shaft 22. The water turbine 4 comprises a turbine shaft 41 with both ends having an impeller 42 and a shaft gear 43 respectively. The shaft gear 43 and the inner toothed ring 24 are directly or indirectly engaged and transmitted. After external water pressure enters into the water turbine 4, the impeller 42 drives the shaft gear 43 to rotate, and after the speed is changed by the transmission gearbox 9, the shaft gear 43 is engaged and transmitted with the inner toothed ring 24. Therefore, the water pressure can be used to drive the hub ring shaft 22 to rewind the water pipe 23 to substitute human power. Obviously, the application is very convenient.

This disclosure further includes a first connecting pipe 5 communicated to a water inlet of the water turbine 4, and external water passing through the first connecting pipe enters into the water turbine 4, and the first connecting pipe 5 has a pressure gauge 6 for detecting an external water pressure and a pressure valve 7 for regulating the external water pressure, so as to regulating the external water pressure.

This disclosure further includes a second connecting pipe 8, and the hub ring shaft 22 includes a coaxial water hole 25, and the other end of the water pipe 23 is communicated with the water hole 25, and the second connecting pipe 8 has an end communicated to a water outlet of the water turbine 4 and the other end communicated to the water hole 25, so that the water for the irrigation can be used as a power to rotate the hub ring shaft 22 for irrigating a lawn directly.

When the rewinding waterwheel serves as an automated structure, the secondary body 1 and the main body 2 are independent structures as long as the water pipe 23 is connected. During irrigations, the secondary body 1 is pulled to the farthest position of the irrigation. After water enters into the water turbine, the shaft gear 43 is driven to rotate to further control the rotation of the hub ring shaft 22 for the rewinding, so that the secondary body 1 moves towards the main body 2, while the water of the water turbine passes through the second connecting pipe 8 and flows towards the hub ring shaft 22 and the water pipe 23, and finally flows the sprinkler head 12 of the secondary body 1 to irrigate the lawn, so as to achieve the automated irrigation without any manual assistance and save manpower.

Figure 7:
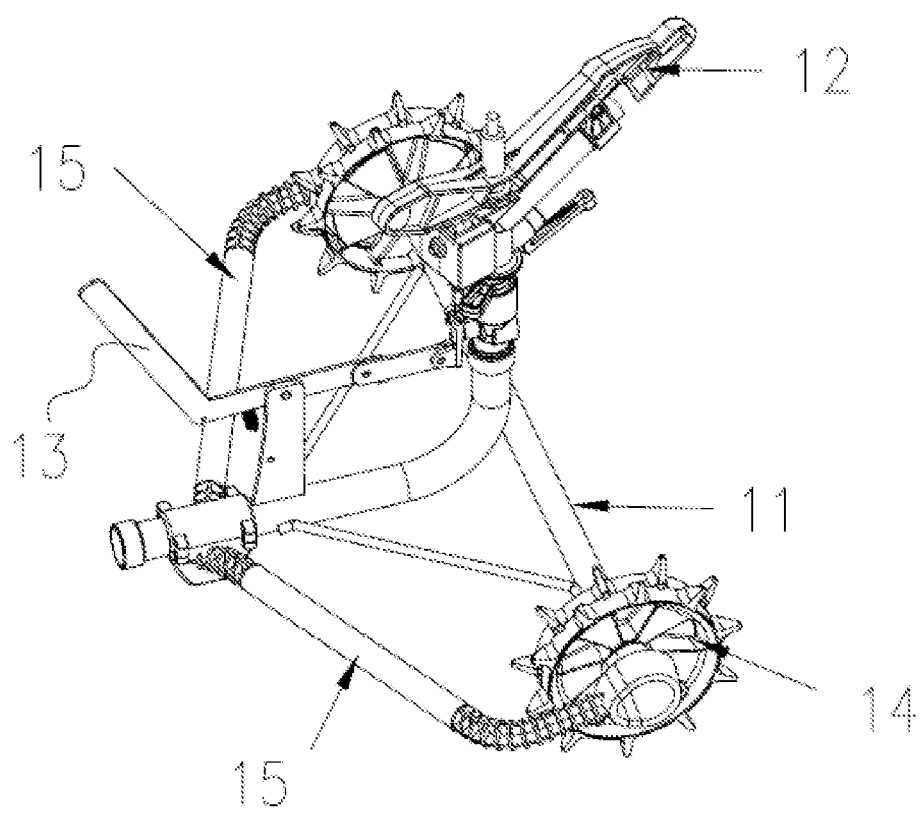
FIG. 7 is a perspective view of a secondary body in an automated rewinding waterwheel in accordance with this disclosure.
Figure 8:
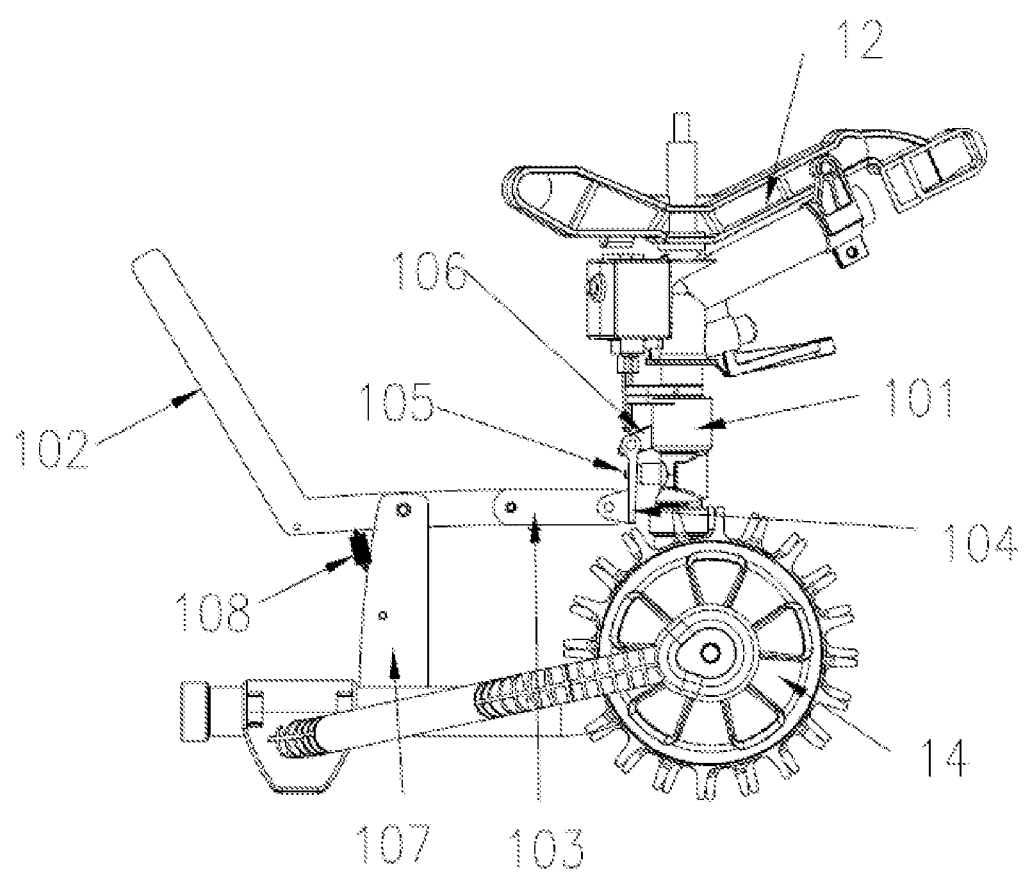
FIG. 8 is a left side view of a secondary body in an automated rewinding waterwheel in accordance with this disclosure.
Figure 9:
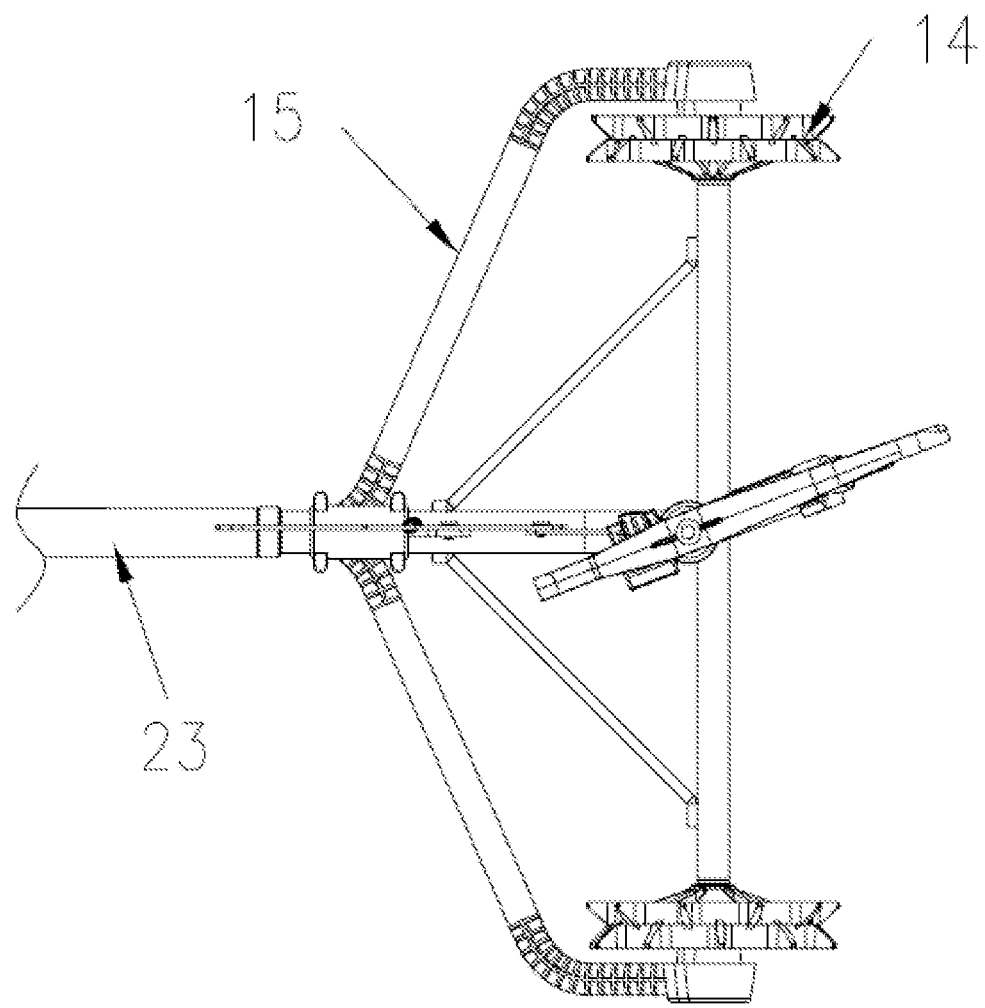
FIG. 9 is a top view of a secondary body in an automated rewinding waterwheel in accordance with this disclosure.

In FIGS. 7 to 9, the secondary body 1 further includes a gate valve switch 13 for controlling the ON/OFF status of the sprinkler head 12. The gate valve switch 13 may be rotated forward to turn off the sprinkler head 12, or rotated backward to turn on the sprinkler head 12. After the rewinding of the water pipe 23, the gate valve switch 13 is in contact with the rewinding waterwheel frame 21, and the tightening force of the water pipe 23 drives the gate valve switch 13 to rotate forward, to turn off the sprinkler head 12.

Specifically, the gate valve switch comprises a valve 101, a hand rod 102, a link rod 103, a hinge plate 104 and a piston head 105, and the water pipe 23, the valve 101, and the sprinkler head 12 are communicated to one another sequentially from bottom to top, and the valve 101 comprises a piston hole and a hinge seat 106, wherein the piston head 105 has an end transversally and movably plugged into the piston hole and the other end coupled to the hinge plate 104, and both upper and lower ends of the hinge plate 104 are respectively and rotatably coupled to the hinge seat 106 and the link rod 103. The waterwheel frame 11 has a mounting plate 107, and the hand rod 102 is rotatably installed onto the mounting plate, and the link rod 103 is hinged to an end of the hand rod 102. To facilitate resuming the original position, this mechanism further includes a spring 108 with both ends coupled to the hand rod 102 and the mounting plate 107 respectively, and the hand rod 102 is always pulled back by the resilience of the spring 108, so as to move the piston head 105 to turn on the sprinkler head 12.

After the rear end of the hand rod 102 touches the rewinding waterwheel frame 21 the hand rod 102 is driven to rotate forward to shut the valve 101, so that the sprinkler head 12 cannot output water.

Figure 10:
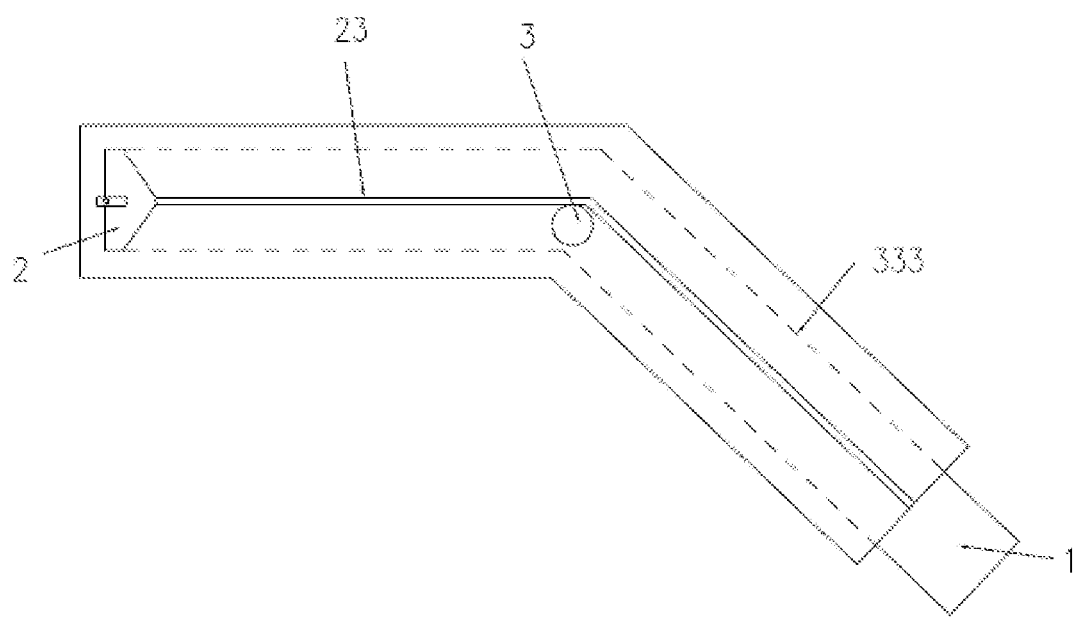
FIG. 10 is a schematic view of a first embodiment of this disclosure.
Figure 11:
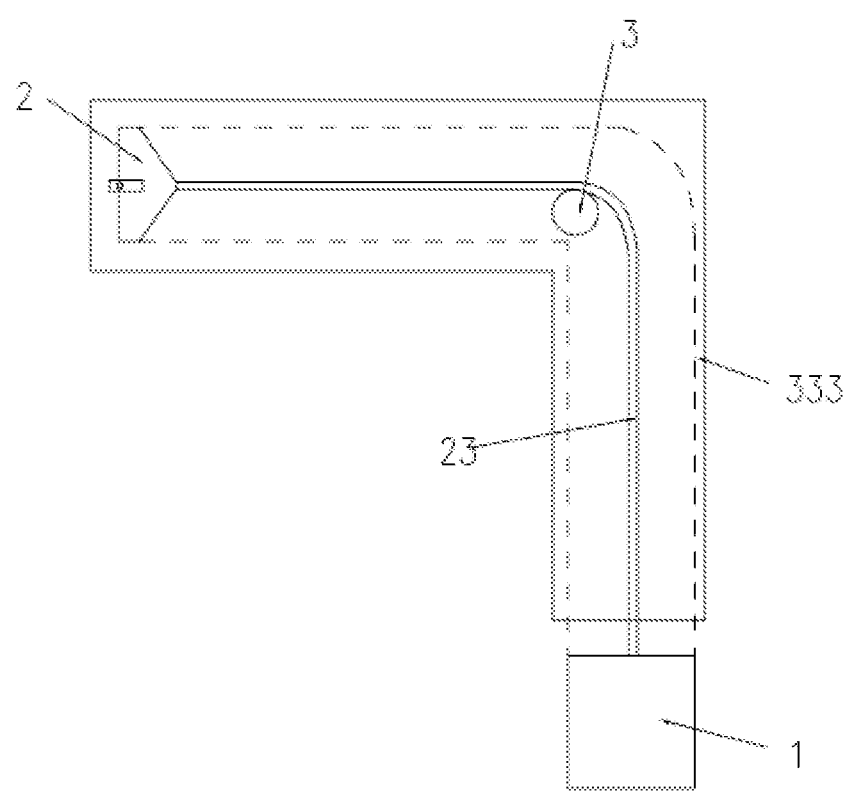
FIG. 11 is a schematic view of a second embodiment of this disclosure.
Figure 12:
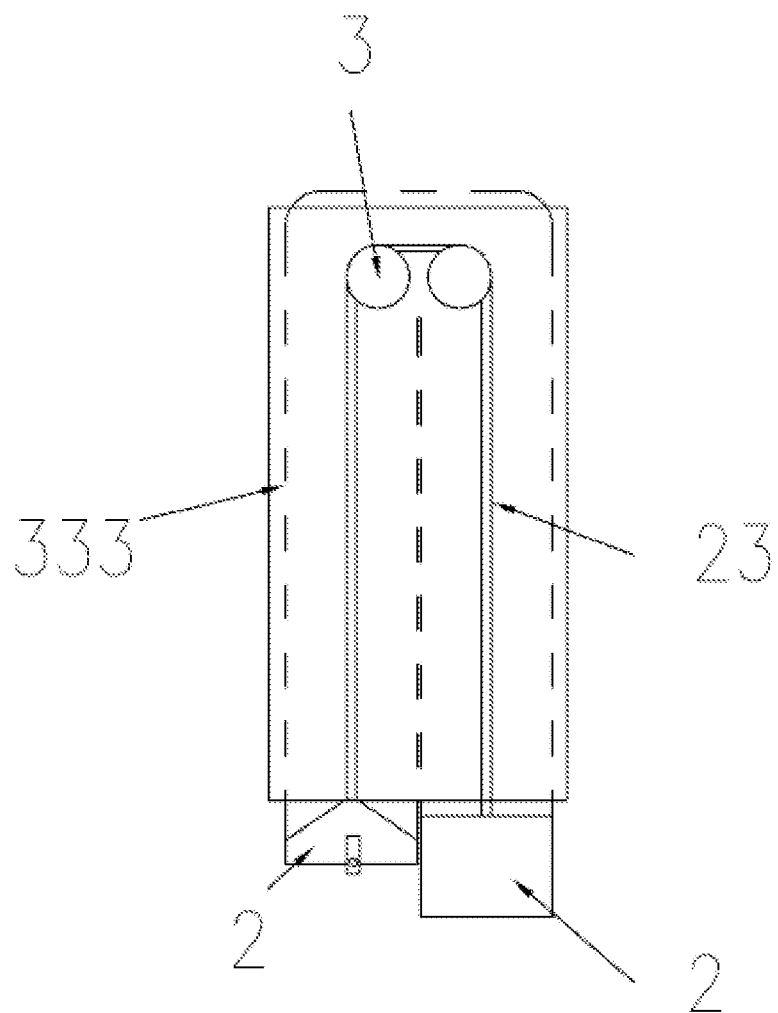
FIG. 12 is a schematic view of a third embodiment of this disclosure.
Figure 13:
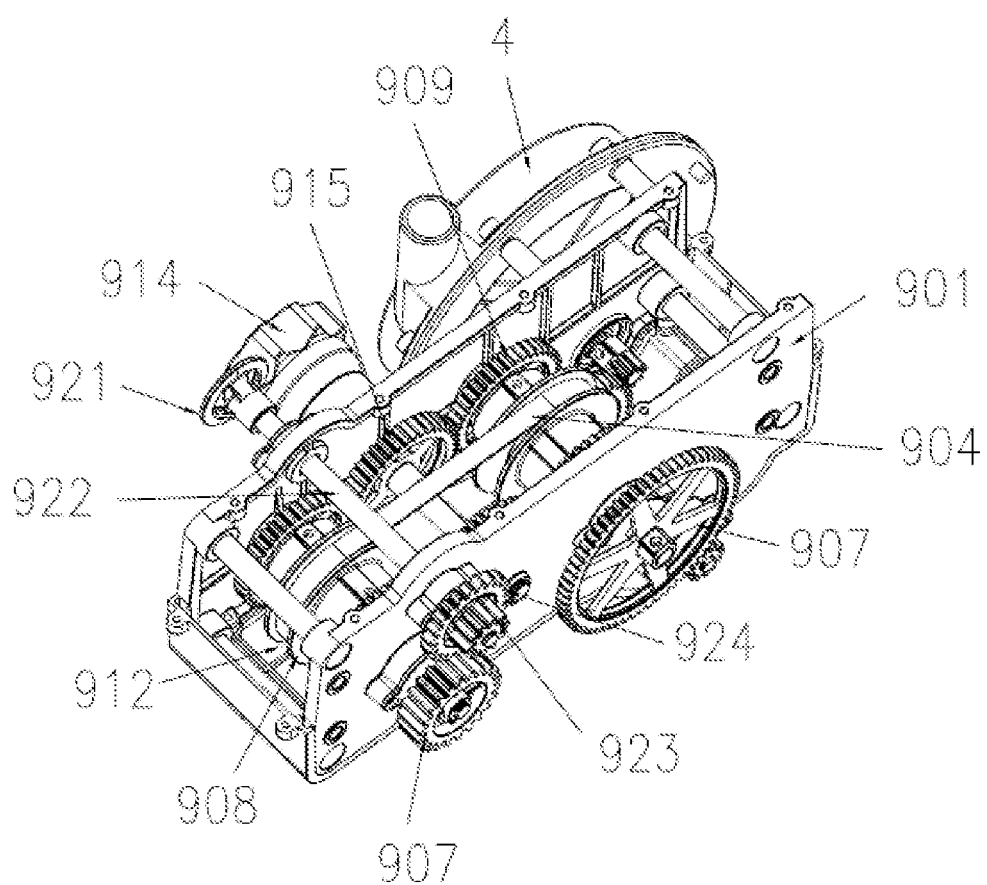
FIG. 13 is a perspective view of a transmission gearbox in an automated rewinding waterwheel in accordance with this disclosure.

The automated structure just can move in a straight line, so that it cannot irrigate places with a different terrain (as shown in FIGS. 10 to 12), so that this disclosure further designs a structure for irrigating places with a different terrain.

Figure 5:
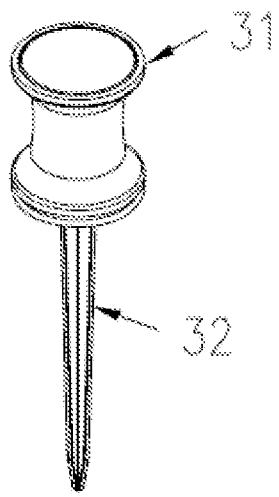
FIG. 5 is a perspective view of a guide member of this disclosure.
Figure 6:
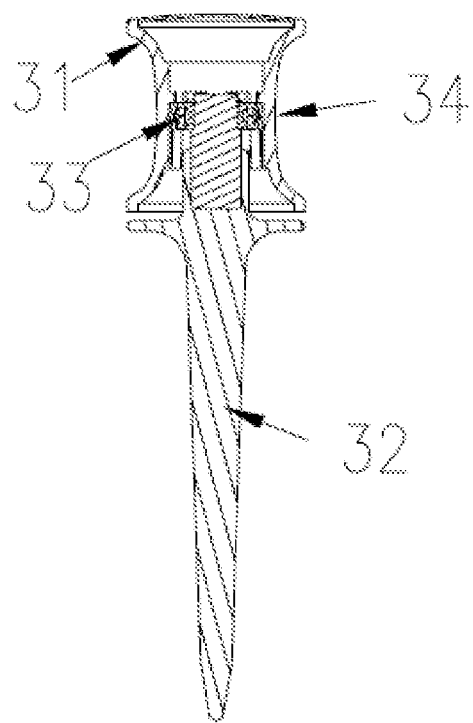
FIG. 6 is a cross-sectional view of a guide member of this disclosure.

In FIGS. 5 and 6, the guide member 3 is installed on the ground, and the guide member 3 comprises a fixed bracket 32, a guide wheel 31 and a bearing 33, and the guide wheel 31 is mounted onto the fixed bracket 32 and rotatable. The outer circumferential surface of the guide wheel 31 is a ring-shaped and concavely formed arc groove 34, and the water pipe 23 is installed in the arc groove 34 and in a rolling contact with the guide wheel 31. The bearing 33 is installed between the guide wheel 31 and the fixed bracket 32 to reduce friction and improve the rolling effect. The lower end of the fixed bracket 31 is a pin structure that can be plugged into the bottom of a lawn directly. The application and operation are very convenient.

To prevent the wheel as the bottom of the waterwheel frame 11 from being hooked by the guide member 3, two symmetrical guide rods 15 are installed at the rear side of the waterwheel frame 11, and a wheel 14 is installed at the bottom of the waterwheel frame 11 and disposed on an inner side of the guide rod 15 to prevent the wheel from being hooked by the guide member 3. In addition, the guide rod 15 is tilted with an angle to reduce the resistance between the waterwheel frame 11 and the guide member 3.

A water spray method of a rewinding waterwheel in accordance with this disclosure comprises the following steps:

(a) Pre-set a traveling path 333 of the waterwheel according to the irrigation range of the waterwheel and the shape and area of the lawn, as shown in FIGS. 10 to 12.

(b) Set a main body 1 with a function of rewinding a water pipe at a start point of the traveling path according to the traveling path 333, and then the main body starts rewinding the water pipe to move a secondary body with a water spray function along the traveling path to an end point of the traveling path 333.

(c) Plug a guide member 3 at a corner point in the traveling path, so that the water pipe 23 is in a rolling contact with the guide wheel 31 of the guide member.

(d) Rewind the water pipe by the main body, so that the secondary body moves along the traveling path 333 by the guide member to perform irrigation.

After the irrigation is finished, the secondary body moves to the start point of the traveling path, and when the rear end of the hand rod 102 touches the rewinding waterwheel frame 21, the hand rod 102 is driven to rotate forward to shut the valve 101, so that the sprinkler head 12 can no longer output water, so as to complete the whole operation.

In FIGS. 13 to 16, a transmission gear box of a rewinding waterwheel comprises a box 901 and a first transmission gear set 902, a second transmission gear set 903, a transmission belt 904 installed in the box, and a speed regulating mechanism 905 installed between the first transmission gear set 902 and the second transmission gear set 903.

Both of the first transmission gear set 902 and the second transmission gear set 903 have a transmission shaft 906 rotatably installed in the box 901 and a transmission gear 907 axially fixed to the transmission shaft 906, and each transmission shaft 906 has two symmetrical spacing adjustment mechanisms, and each spacing adjustment mechanism includes a pulley 908, a clutch gear 909 and an external threaded sleeve 910 arranged sequentially from the inside to the outside. The clutch gear 909 is sheathed on the external threaded sleeve 910 and coupled to the external threaded sleeve 910 through a thread, and the pulley 908 moves in an axial direction with respect to the transmission shaft 906, and the outer circumferential surface of the pulley 908 has a bevel 911, and an interval 912 is formed between the bevels 911 of the two pulleys 908 for installing the transmission belt 904.

The speed regulating mechanism 905 comprises a speed regulating shaft 913 and a speed regulating hand wheel 914 rotatably installed into the box 901, and two speed gear 915 coaxially fixed to the speed regulating shaft 913. The speed regulating hand wheel 914 and the speed regulating shaft 913 are coupled to each other for controlling the rotation of the speed regulating shaft 913, and the speed gears 915 are engaged and transmitted with both left and right clutch gears 909 respectively. Specifically, the speed gear 915 axially facing an end is engaged and transmitted with two clutch gears 909 at positions axially facing an end, and the speed gear 915 axially facing the other end is engaged and transmitted with two clutch gears 909 at positions axially facing the other end.

In the aforementioned clutch gears 909, the number of teeth and diameter are the same. Of course, the number of teeth and diameter of the speed gears 915 are also the same. The external threaded sleeve 910 is sheathed on the transmission shaft 906 and fixed and coupled to the box 901. Under a normal operation of the transmission gearbox, the clutch gear 909 and the speed gear 915 are situated at a stop status.

The clutch gear 909 of the two spacing adjustment mechanisms in the first transmission gear set 902 and the thread structure of the external threaded sleeve 910 are left handed and right handed respectively. The clutch gear 909 of the two spacing adjustment mechanisms in the second transmission gear set 903 and the thread structure of the external threaded sleeve 910 are right-handed and left-handed respectively. Therefore, when the speed gear 915 drives the clutch gear to rotate, the interval between the two pulleys 908 of the first transmission gear set 902 and the interval between the two pulleys 908 of the second transmission gear set 903 are changed in opposite manners. In other words, when the interval between the two pulleys 908 of the first transmission gear set 902 becomes larger, the interval between the two pulleys 908 of the second transmission gear set 903 becomes smaller, and vice versa. Due to the change of the intervals, the diameters of the first transmission gear set 902 and the first transmission gear set 902 disposed on the transmission belt 904 are also changed. Person having ordinary skill in the art should know that the rotation speed ratio is calculated by dividing the diameter of a larger gear by the diameter of the smaller gear. Therefore, this disclosure can regulate the rotation speed of the first transmission gear set 902 and the first transmission gear set 902 accordingly.

The transmission gear 907 of the first transmission gear set 902 is transmitted and cooperated with an input gear of the rewinding waterwheel. In other words, the shaft gear 43 of the water turbine 4 is directly or indirectly engaged and transmitted, and the transmission gear 907 of the second transmission gear set 903 is transmitted and cooperated with the output gear, so that the operation time can be calculated accurately according to the rewinding rate of the water pipe and the irrigation speed of the secondary body 1.

The pulley 908 includes a polygonal shaft hole 916, and a section of the cross-section of the transmission shaft is in in a polygonal shape, and the shaft hole 916 is sheathed on the transmission shaft 906 of that section.

This disclosure further comprises a plurality of steel balls 917, and the clutch gear 909 comprises a coaxial ring 918, and both of the outer circumferential surface of the ring 918 and the inner circumferential surface of the pulley 908 have an arc ring groove 919, and the steel balls 917 are installed into the two ring grooves 919, so that the clutch gear 909 and the pulley 908 can be coupled and rotatable with respect to each other.

This disclosure further comprises a clutch mechanism 920, and the clutch mechanism 920 comprises a clutch handle 921 and a clutch shaft 922. The clutch shaft 922 is installed onto the box 901 and axially movable. The clutch shaft 922 has an end coupled to the handle 921 and the other end having an axial output gear 923 and a clutch gear 924, and the output gear 923 is engaged and transmitted with the inner toothed ring 24 of the rewinding waterwheel, and the clutch gear 924 is cooperated and transmitted with the transmission gear 907 of the second transmission gear set 903. When no irrigation takes place, the clutch handle 921 may be moved axially to separate the output gear 923 from the inner toothed ring 24 of the rewinding waterwheel to remove the water pipe from the hub ring shaft manually. The operation is very convenient.

Figure 14:
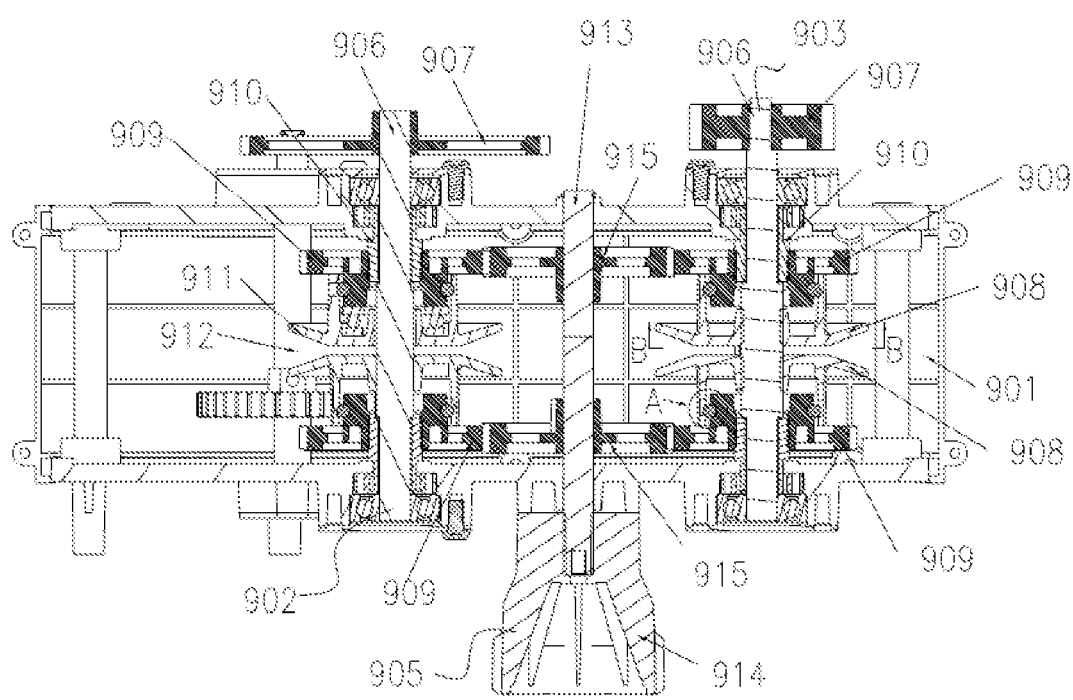
FIG. 14 is a cross-sectional view of a transmission gearbox in an automated rewinding waterwheel in accordance with this disclosure.
Figure 15:
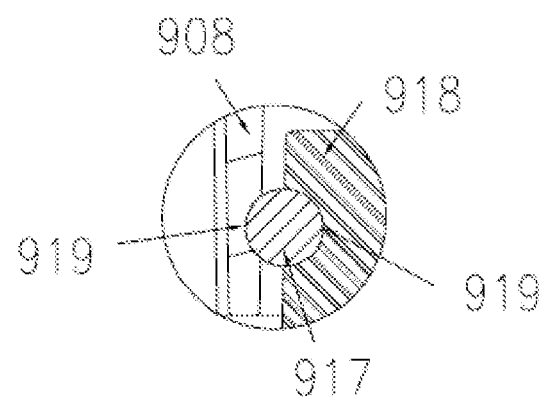
FIG. 15 is an enlarged view of part A shown in FIG. 14.
Figure 16:
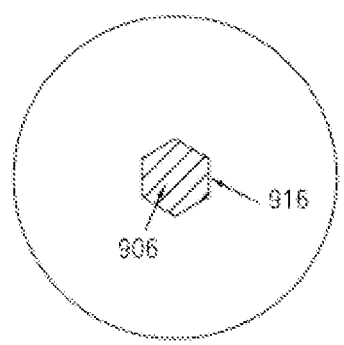
FIG. 16 is a partial cross-sectional view taken along line B-B in FIG. 14.

In FIG. 14, when the speed is changed, the rotation speed regulating hand wheel 914 drives the speed gear 915 to rotate. While the speed gear 915 is rotating, the two clutch gears 909 disposed axially with respect to the first transmission gear set 902 and the first transmission gear set 902 are rotated. Since the clutch gear 909 at the lower end of the first transmission gear set 902 configured to be corresponsive to the thread structure between the external threaded sleeves 910 is a right-handed thread structure, and the clutch gear 909 at the upper end of the first transmission gear set 902 configured to be corresponsive to the thread structure between the external threaded sleeves 910 is a left-handed thread structure, and the clutch gear 909 at the lower end of the second transmission gear set 903 configured to be corresponsive to the thread structure between the external threaded sleeves 910 is a left-handed thread structure, and the clutch gear 909 at the upper end of the second transmission gear set 903 configured to be corresponsive to the thread structure between the external threaded sleeves 910 is a right-handed thread structure, therefore both of the interval between the two pulleys 908 of the first transmission gear set 902 and the interval between the two pulleys 908 of the second transmission gear set 903 may be changed, and they changed in an opposite manner. Persons having ordinary skill in the art should know that the rotation speed ratio is calculated by dividing the diameter of a larger gear by the diameter of a smaller gear, so that this disclosure can regulate the rotation speed of the first transmission gear set 902 and the first transmission gear set 902 to change the gear rotation speed of the output gear 923 in order to control the moving speed of the secondary body 1 and the rewinding rate of the water pipe. Therefore, the total water volume of the irrigation can be controlled effectively.

While this disclosure has been described by means of specific embodiments, numerous modifications and variations could be made thereto by those skilled in the art without departing from the scope and spirit of the invention set forth in the claims.

What is claimed is:

1. A rewinding waterwheel, comprising a secondary body (1), a main body (2), and a plurality of guide members (3); wherein the main body comprises a rewinding waterwheel frame (21), a hub ring shaft (22) and a water pipe (23) wound around the hub ring shaft (22) and mounted on the rewinding waterwheel frame (21) and free to rotate;
   the secondary body (1) comprises a waterwheel frame (11) and a sprinkler head (12) fixed and installed onto the waterwheel frame; and an end of the water pipe (23) is fixed and communicated to the sprinkler head (12); and
   a guide member of the plurality of guide members (3) is installed on a ground, and the water pipe (23) is in a rolling contact with an outer circumferential surface of the guide member (3);
   wherein the secondary body (1) further comprises a gate valve switch (13) for controlling the ON/OFF status of the sprinkler head (12), and the gate valve switch (13) is rotated forward to turn off the sprinkler head (12) and rotated backward to turn on the sprinkler head (12); after rewinding the water pipe (23), the gate valve switch (13) is contacted with the rewinding waterwheel frame (21), and a tightening force of the water pipe (23) is provided to drive the gate valve switch (13) to be rotated forward to turn off the sprinkler head (12);
   wherein the gate valve switch comprises a valve (101), a hand rod (102) having a horizontal section, a link rod (103), a hinge plate (104) and a piston head (105), and the water pipe (23), the valve (101), and the sprinkler head (12) are sequentially communicated to one another from bottom to top, and the valve (101) comprises a piston hole and a hinge seat (106), and an end of the piston head (105) is transversally and movably plugged into the piston hole, and the other end of the piston head (105) is coupled to the hinge plate (104), and both upper and lower ends of the hinge plate (104) are rotatably coupled to the hinge seat (106) and the link rod (103) respectively, and the waterwheel frame (11) has a mounting plate (107) installed thereto, and the hand rod (102) is rotatably installed onto the mounting plate (107), and the link rod (103) is hinged to an end of the horizontal section of the hand rod (102).

2. The rewinding waterwheel of claim 1, wherein the guide member (3) comprises a fixed bracket (32) and a guide wheel (31) installed onto the fixed bracket (32) and rotatable with respect to the fixed bracket (32).

3. The rewinding waterwheel of claim 2, wherein the rewinding waterwheel further comprises a bearing installed between the guide wheel (31) and the fixed bracket (32).

4. The rewinding waterwheel of claim 3, wherein the fixed bracket (31) has a lower end which is a pin structure.

5. The rewinding waterwheel of claim 2, wherein the guide wheel (31) has the outer circumferential surface which is a ring shaped and concavely formed arc groove (34), and the water pipe (23) is disposed in the arc groove (34).

6. The rewinding waterwheel of claim 1, further comprising a spring (108) with both ends coupled to the hand rod (102) and the mounting plate (107) respectively, and the hand rod (102) is always pulled back by the resilience of the spring (108).

7. The rewinding waterwheel of claim 1, wherein the waterwheel frame (11) has two symmetrical guide rods (15) installed to the rear of the water frame (11), and a wheel (14) installed at the bottom of the waterwheel frame (11) and disposed on an inner side of the guide rod (15).

8. The rewinding waterwheel of claim 7, wherein the guide rod (15) is tilted with an angle.

9. The rewinding waterwheel of claim 1, further comprising a water turbine (4); the hub ring shaft (22) having a coaxial inner toothed ring (24) disposed on an axial side, and the water turbine (4) comprising a turbine shaft (41), and an impeller (42) and a shaft gear (43) disposed at both ends of the turbine shaft (41) respectively; the shaft gear (43) being engaged and transmitted directly with the inner toothed ring (24), and the impeller (42) driving the shaft gear (43) to rotate after external water pressure enters into the interior of the water turbine (4).

10. The rewinding waterwheel of claim 9, further comprising a first connecting pipe (5) communicated to the water inlet of the water turbine (4), and external water entering from the first connecting pipe into the water turbine (4), and the first connecting pipe (5) having a pressure gauge (6) for detecting the external water pressure and a pressure valve (7) for regulating the external water pressure.

11. The rewinding waterwheel of claim 9, further comprising a second connecting pipe (8), and the hub ring shaft (22) including a coaxial water hole (25), and the other end of the water pipe (23) being communicated with the water hole (25), and the second connecting pipe (8) having an end communicated to a water outlet of the water turbine (4) and the other end communicated to the water hole (25).

12. A water spray method of the rewinding waterwheel of claim 1, comprising the steps of:
   (a) pre-setting a traveling path (333) of the waterwheel of claim 1 according to the irrigation range of the waterwheel and the shape and area of a lawn;
   (b) setting the main body with a rewinding water pipe function at a start point of the traveling path according to the traveling path (333), and then the main body starting to roll the water pipe, so that the secondary body with a water spray function moves along the traveling path to an end point of the traveling path;
   (c) plugging the guide member to a corner point in the traveling path, so that the water pipe is in a rolling contact with the guide member;

(d) rewinding the water pipe by the main body, so that the secondary body performs an irrigation along the traveling path through the guide member.

13. A transmission gearbox of the rewinding waterwheel of claim 1, comprising a box (901), a first transmission gear set (902) installed in the box, a second transmission gear set (903), a transmission belt (904) and a speed regulating mechanism (905) installed between the first transmission gear set (902) and the second transmission gear set (903);

both of the first transmission gear set (902) and the second transmission gear set (903) having a transmission shaft (906) rotatably installed into the box (901) and a transmission gear (907) axially fixed to the transmission shaft (906), and each transmission shaft (906) having two symmetrical spacing adjustment mechanisms, and each spacing adjustment mechanism including a pulley (908), a clutch gear (909) and an external threaded sleeve (910) arranged sequentially from the inside to the outside;

the clutch gear (909) being sheathed on the external threaded sleeve (910) and coupled to the external threaded sleeve (910) by a thread, and the pulley (908) moving in an axial direction with respect to the transmission shaft (906), and the outer circumferential surface of the pulley (908) having a bevel (911), and an interval (912) being formed between the bevels (911) of two pulleys (908) for installing the transmission belt (904);

the speed regulating mechanism (905) comprising a speed regulating shaft (913) rotatably installed into the box (901), and the speed regulating hand wheel (914) and two speed gears (915) coaxially fixed to the speed regulating shaft (913), and the speed regulating hand wheel (914) and the speed regulating shaft (913) being coupled to each other for controlling the rotation of the speed regulating shaft (913), and the speed gears (915) being engaged and transmitted with both left and right clutch gears (909) respectively;

the clutch gear (909) of the two spacing adjustment mechanisms in the first transmission gear set (902) and the thread structure of the external threaded sleeve (910) being left handed and right handed respectively;

and the clutch gear (909) of the two spacing adjustment mechanisms in the second transmission gear set (903) and the thread structure of the external threaded sleeve (910) being right-handed and left-handed respectively.

14. The transmission gearbox of the rewinding waterwheel according to claim 13, wherein the transmission gear (907) of the first transmission gear set (902) is transmitted and cooperated with the rewinding waterwheel, and the transmission gear (907) of the second transmission gear set (903) is transmitted and cooperated with the output gear.

15. The transmission gearbox of the rewinding waterwheel according to claim 13, wherein the pulley (908) includes a polygonal shaft hole (916), and a section of the transmission shaft has a cross-section in a polygonal shape, and the shaft hole (916) is sheathed on the section of the transmission shaft (906).

16. The transmission gearbox of the rewinding waterwheel according to claim 13, further comprising a plurality of steel balls (917), and the clutch gear (909) comprising a coaxial ring (918), and both inner circumferential surfaces of the ring (918) and the pulley (908) having an arc ring groove (919), and the steel balls (917) being installed into the two ring grooves (919).

17. The transmission gearbox of the rewinding waterwheel according to claim 13, further comprising a clutch mechanism (920), and the clutch mechanism (920) comprising a clutch handle (921) and a clutch shaft (922); and the clutch shaft (922) being installed onto the box (901) and axially movable, and the clutch shaft (922) having an end coupled to the handle (921), and the other end installed with an axial output gear (923) and a clutch gear (924), and the output gear (923) being engaged and transmitted with the inner toothed ring (24) of the rewinding waterwheel, and the clutch gear (924) being cooperated and transmitted with the transmission gear (907) of the second transmission gear set (903).

18. The rewinding waterwheel of claim 1, further comprising a water turbine (4); the hub ring shaft (22) having a coaxial inner toothed ring (24) disposed on an axial side, and the water turbine (4) comprising a turbine shaft (41), and an impeller (42) and a shaft gear (43) disposed at both ends of the turbine shaft (41) respectively; the shaft gear (43) being engaged and transmitted indirectly with the inner toothed ring (24), and the impeller (42) driving the shaft gear (43) to rotate after external water pressure enters into the interior of the water turbine (4);

wherein the rewinding waterwheel further comprises a transmission gearbox (9), and the shaft gear (43) being engaged and transmitted with the inner toothed ring (24) after the speed is changed by the transmission gearbox (9).

* * * * *